(12) United States Patent
Kadowaki et al.

(10) Patent No.: US 8,384,561 B2
(45) Date of Patent: Feb. 26, 2013

(54) PARKING ASSIST DEVICE

(75) Inventors: Jun Kadowaki, Anjo (JP); Kazuya Watanabe, Anjo (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 642 days.

(21) Appl. No.: 12/476,706

(22) Filed: Jun. 2, 2009

(65) Prior Publication Data

US 2009/0303080 A1    Dec. 10, 2009

(30) Foreign Application Priority Data

Jun. 5, 2008 (JP) .................................. 2008-148430

(51) Int. Cl.
*B60Q 1/48* (2006.01)
*G06K 9/00* (2006.01)

(52) U.S. Cl. ...................... 340/932.2; 382/104; 348/148

(58) Field of Classification Search ................ 340/932.2, 340/937; 701/28, 41, 42; 348/148; 382/104
See application file for complete search history.

(56) References Cited

U.S. PATENT DOCUMENTS

| | | | |
|---|---|---|---|
| 6,611,744 B1 * | 8/2003 | Shimazaki et al. ............. 701/41 | |
| 7,012,549 B2 | 3/2006 | Mizusawa et al. | |
| 7,295,227 B1 | 11/2007 | Asahi et al. | |
| 7,756,300 B2 * | 7/2010 | Jung et al. ...................... 382/113 | |
| 8,013,721 B2 * | 9/2011 | Yamanaka et al. ............. 340/435 | |
| 8,031,225 B2 * | 10/2011 | Watanabe et al. ............. 348/148 | |
| 8,180,525 B2 * | 5/2012 | Luke et al. ...................... 701/36 | |
| 8,184,019 B2 * | 5/2012 | Chauvin et al. ............. 340/932.2 | |
| 2001/0030688 A1 * | 10/2001 | Asahi et al. ..................... 348/118 | |
| 2002/0175832 A1 | 11/2002 | Mizusawa et al. | |
| 2006/0255969 A1 * | 11/2006 | Sakakibara ................. 340/932.2 | |
| 2006/0274147 A1 * | 12/2006 | Chinomi et al. ............. 348/118 | |
| 2007/0146165 A1 * | 6/2007 | Tanaka ........................ 340/932.2 | |

FOREIGN PATENT DOCUMENTS

| | | |
|---|---|---|
| JP | 11-334470 A | 12/1999 |
| JP | 2001-158313 A | 6/2001 |
| JP | 2003-011762 A | 1/2003 |
| JP | 2008-049889 A | 3/2008 |
| JP | 2008-055958 A | 3/2008 |

OTHER PUBLICATIONS

Japanese Office Action dated Jun. 21, 2012, issued in corresponding Japanese Patent Application No. 2008-148430.

Office Action in corresponding Japanese Patent Application No. 2008-148430, dated Nov. 15, 2012.

* cited by examiner

*Primary Examiner* — Benjamin C Lee
*Assistant Examiner* — Sigmund Tang
(74) *Attorney, Agent, or Firm* — Sughrue Mion, PLLC

(57) ABSTRACT

A parking assist device comprises an image obtaining portion for obtaining a surrounding image of a vehicle, a display controlling portion for displaying the surrounding image and a pair of vehicle width extended lines on a displaying device provided at an interior of the vehicle in such a way that the pair of vehicle width extended lines is superposed on the surrounding image, the vehicle width extended lines serving as indicative lines for notifying a driver of a width of the vehicle and a stall line detecting portion for detecting a pair of stall lines indicating a parking stall, wherein, when the pair of the stall lines is detected, the display controlling portion changes a distance between the vehicle width extended lines corresponding to a distance between the stall lines.

11 Claims, 7 Drawing Sheets

PARKING ASSIST DEVICE

CROSS REFERENCE TO RELATED APPLICATIONS

This application is based on and claims priority under 35 U.S.C. §119 to Japanese Patent Application 2008-148430, filed on Jun. 5, 2008, the entire content of which is incorporated herein by reference.

FIELD OF THE INVENTION

The present invention relates to a parking assist device for assisting a driver's operation when a parking operation is executed to park a vehicle in a parking stall.

BACKGROUND

According to a known parking assist device such as a display apparatus for displaying a surrounding image of a vehicle, a driver's operation upon a parking operation is assisted by use of the surrounding image of the vehicle captured by an imaging device, the image including an indicative line to be followed upon the parking operation. For example, according to a displaying device disclosed in JPH11-334470A, when a parking operation to park the vehicle in a parking stall is executed, indicative lines indicating a moving estimated locus of the vehicle toward a parking target position are set on the basis of a rudder angle of a steering operation executed by the driver.

According to the above-mentioned known device, however, because the indicative lines (e.g., right and left indicative lines) appear with a predetermined distance therebetween, and the distance is set not to depend on a width of a parking stall. Thus, the driver may find it hard to accurately recognize a position to park the vehicle. Accordingly, when the parking operation is executed in order to park the vehicle in a parking stall in a manner where the vehicle is positioned so as to be parallel to the parking stall, the driver needs to operate the vehicle in such a way that the indicative lines in the surrounding image become parallel to stall lines (e.g., right and left stall lines) indicating the parking stall, on the basis of the information from the image appearing on the display apparatus, in which the stall lines indicating the parking stall are largely distant from the indicative lines.

Further, when a parking operation to park the vehicle in a parking stall is executed in a manner where the vehicle is positioned at a central point of the parking stall, the driver needs to operate the vehicle in such a way that a distance between the right stall line and the right indicative line is equal to a distance between the left stall line and the left indicative line.

A need thus exists for a parking assist device which is not susceptible to the drawback mentioned above.

SUMMARY OF THE INVENTION

According to an aspect of the present invention, a parking assist device comprises an image obtaining portion for obtaining a surrounding image of a vehicle, the surrounding image captured by an imaging device provided at the vehicle, a display controlling portion for displaying the surrounding image and a pair of vehicle width extended lines on a displaying device provided at an interior of the vehicle in such a way that the pair of vehicle width extended lines is superposed on the surrounding image, the vehicle width extended lines serving as indicative lines for notifying a driver of a width of the vehicle and a stall line detecting portion for detecting a pair of stall lines in the surrounding image, the stall lines indicating a parking stall, wherein, when the pair of the stall lines is detected by the stall line detecting portion, the display controlling portion changes a distance between the vehicle width extended lines corresponding to a distance between the stall lines.

BRIEF DESCRIPTION OF THE DRAWINGS

The foregoing and additional features and characteristics of the present invention will become more apparent from the following detailed description considered with the reference to the accompanying drawings, wherein.

DETAILED DESCRIPTION

Figure 1:
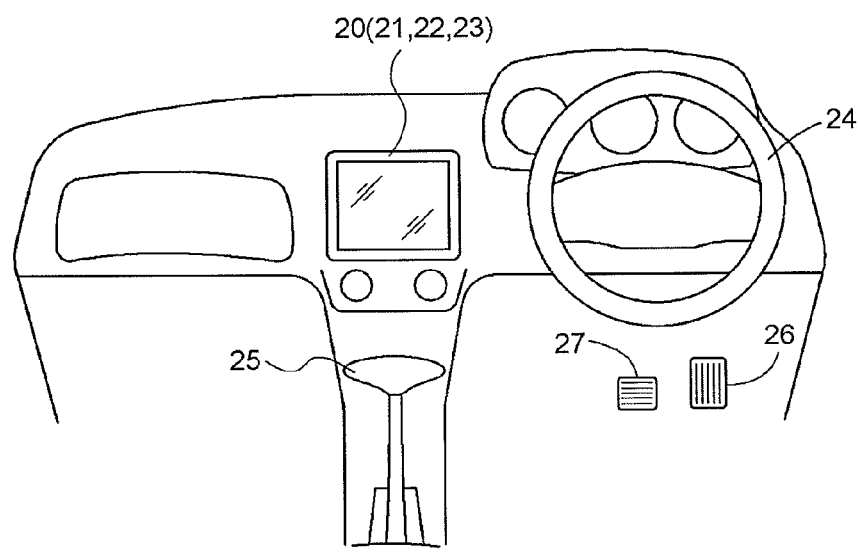
FIG. 1 is an explaining view of a front portion of a driver's seat of a vehicle.
Figure 2:
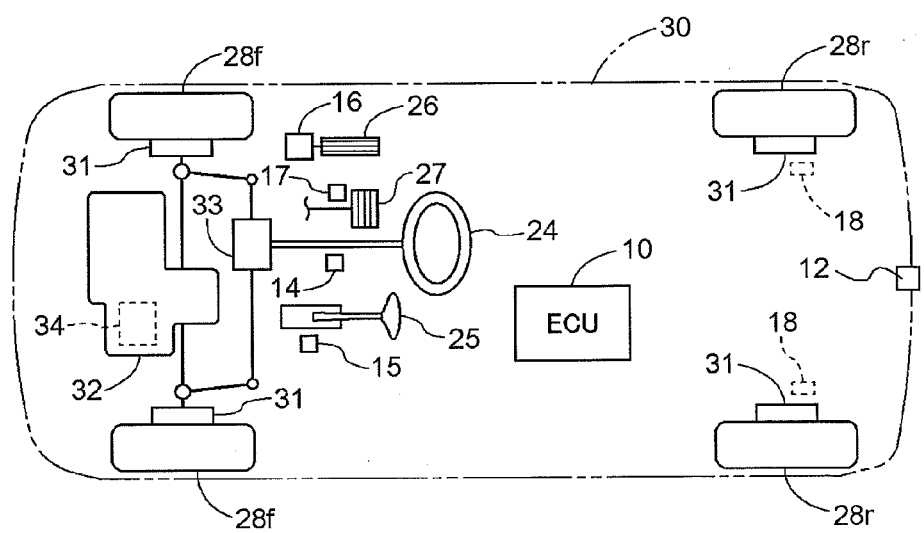
FIG. 2 is a block diagram indicating a basic configuration of the vehicle.

An embodiment of the present invention will be explained in accordance with the drawings attached hereto. FIGS. 1 and 2 illustrate drawings each indicating a basic configuration of a vehicle 30 including a parking assist device related to the present invention. A steering wheel 24 is provided in front of a driver's seat of the vehicle 30, and a power steering unit 33 rotating simultaneously with the steering wheel 24 transmits a rotational operation force of the steering wheel 24 to front wheels 28f in order to steer the vehicle 30. Further, an engine 32 and a transmission 34 are mounted to the vehicle 30 at a front portion thereof. The transmission 34 includes a torque converter, a continuously variable transmission (CVT) and the like, and a torque speed from the engine 32 is converted by the torque converter and the CVT and transmitted to the front wheels 28f and rear wheels 28r. Depending on a driving type (a front wheel drive, a rear wheel drive or a four-wheel drive) of the vehicle 30, the torque is transmitted to both of or one of the front wheels 28f and the rear wheels 28r. Further, in the vicinity of the driver's seat, an accelerator pedal 26 and a brake pedal 27 are arranged in parallel (juxtaposed). The accelerator pedal 26 serves as an accelerator operating means for controlling a moving speed of the vehicle 30, and the brake pedal 27 is operated for applying a braking force to the front wheels 28f and the rear wheels 28r through a braking apparatus 31 provided at each of the front wheels 28f and the rear wheels 28r.

Furthermore, a monitor 20 (displaying device) is provided at an upper portion of a console box provided in the vicinity of the driver's seat. The monitor 20 includes a display 21, and a touch panel 23 is formed on the display 21. In the embodiment, the monitor 20 includes a liquid crystal display with backlighting and also includes a speaker 22. The touch panel 23 employs a pressure-sensitive touch panel or a static-type touch panel, and the touch panel 23 outputs positional information where an operator (driver) touches the monitor 20 as a location data. In a case where a car navigation system is mounted to the vehicle 30, the monitor 20 may also be used as a displaying device for the navigation system.

The monitor 20 may include a plasma display panel or a cathode-ray tube display (CRT display), and the speaker 22 may not be provided at the monitor 20 and may be provided at different locations such as an inner surface of a door of the vehicle 30.

On an operation system of the steering wheel 24, a steering sensor 14 is provided in order to measure an operational direction and an operation amount of the steering wheel 24. On an operation system of a shift lever 25, a shift position sensor 15 is provided in order to determine a shift position. On an operation system of the accelerator pedal 26, an accelerator sensor 16 is provided in order to measure an operation amount of the accelerator pedal 26. On an operation system of the brake pedal 27, a brake sensor 17 is provided in order to determine whether or not the brake pedal 27 is operated.

A rotation sensor 18 serving as a moving distance detecting sensor is provided for measuring a rotational amount of at least one of the front wheels 28f and the rear wheels 28r. According to the embodiment, the rotation sensor 18 is provided at each rear wheel 28r. The moving distance of the vehicle 30 may be alternatively measured on the basis of a rotation amount of a driving system of the vehicle 30. Further, the vehicle 30 includes an electronic control unit (ECU) 10 serving as a core unit of a parking assist device related to the present invention. Specifically, the ECU 10 executes a moving control of the vehicle 30 including a parking assist control.

The vehicle 30 includes a camera 12 mounted at a rear portion of the vehicle 30 in order to capture a rear view of the vehicle 30. The camera 12 includes a digital camera having an imaging element such as a charge-coupled device (CCD), a CMOS image sensor (CIS) and the like so that information of an image captured by the imaging element is outputted in real-time as motion picture information. The camera 12 includes a wide-angle lens having a field angle of 140 degrees in a horizontal direction. The camera 12 is set so as to be in, for example, 30 degrees of a depression angle so that the camera 12 captures an image in an area that includes approximately 8 meters from a rear end of the vehicle 30. The captured image is inputted to the ECU 10 and used for the parking assist operation.

Figure 3:
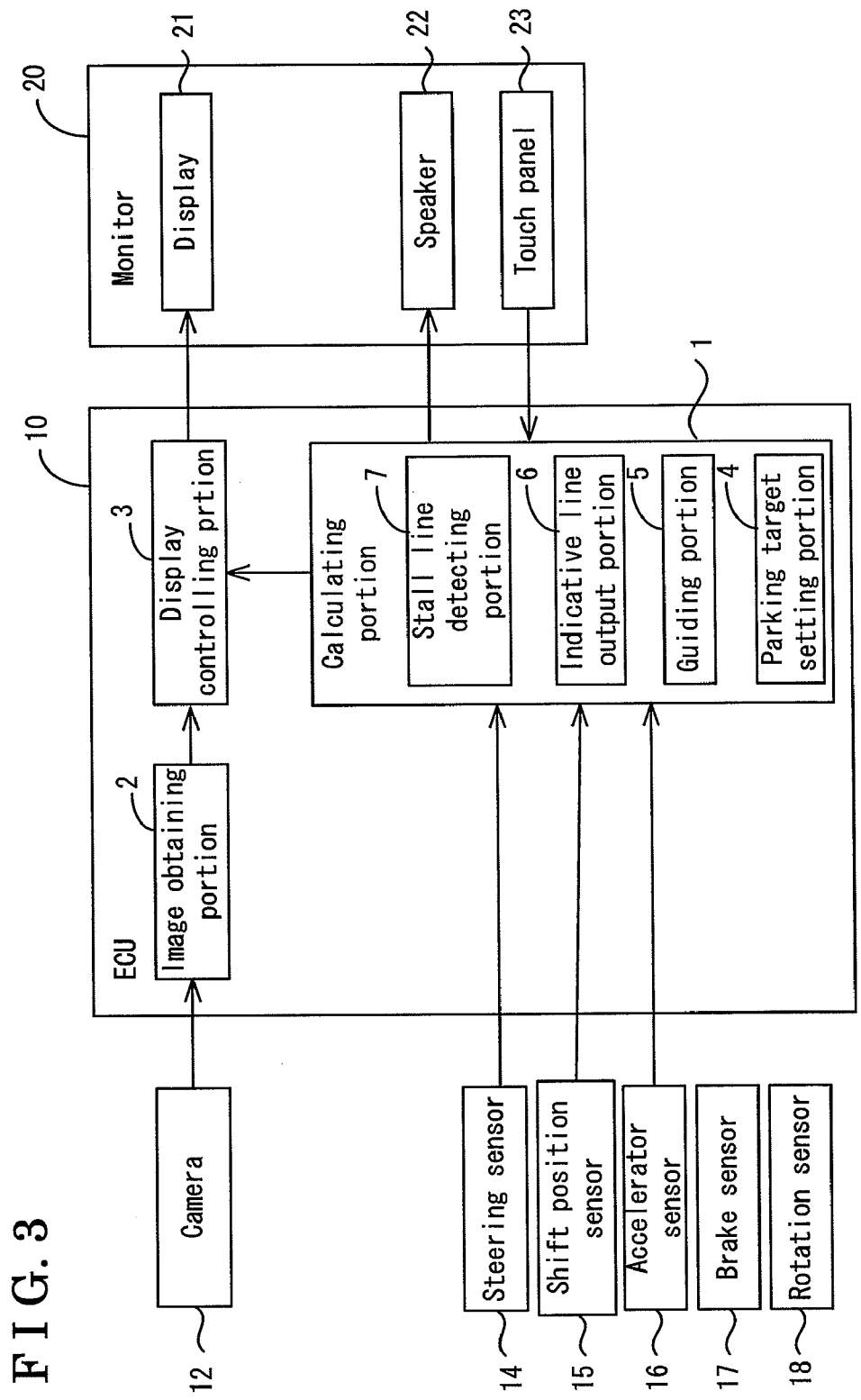
FIG. 3 is a block diagram schematically indicating a configuration of a parking assist device related to the present invention.

FIG. 3 illustrates a block diagram schematically indicating an example of a configuration of the parking assist device in which the ECU 10 serves as the core portion related to the present invention. As indicated in FIG. 3, the ECU 10 is composed of plural functional portions such as a calculating portion 1, an image obtaining portion 2, a display controlling portion 3 and the like. The calculating portion 1 further includes functional portions such as a parking target setting portion 4 for setting a parking target position and a stall line detecting portion 7 for determining whether or not parallel stall lines indicating a parking stall exist in the surrounding image of the vehicle 30. The surrounding image is captured by the camera 12 and obtained by means of the image obtaining portion 2. Each of the abovementioned functional portions of the ECU 10 mainly includes a logical operating hardware such as a microcomputer or a digital signal processor (DSP) and works in cooperation with software such as a program executed on the hardware. Accordingly, each functional portion indicates a functional partial role so that each functional portion may not be configured physically independently. Furthermore, the ECU 10 also includes various type of memory such as a frame memory for storing the image and various type of electronic circuit such as an image processing circuit. Because configurations and functions of the memory and the electronic circuit are already known, illustrations and detailed explanations thereof are omitted here.

The image obtaining portion 2 is a functional portion for obtaining the surrounding image of the vehicle 30 captured by the camera 12 (imaging device). The image obtaining portion 2 is configured so as to include the frame memory for storing an image and a synchronizing separator circuit. The display controlling portion 3 is a functional portion for displaying the surrounding image of the vehicle 30 captured by the camera 12 and a vehicle width extended line on the monitor 20 (displaying device) provided at the exterior of the vehicle 30, in a manner where the vehicle width extended line is superposed on the surrounding image. In this example, a pair of vehicle width extended lines (right and left vehicle width extended lines) is superposed on the surrounding image, and the pair of vehicle width extended lines serves as indicative lines by which the driver recognizes the width of the vehicle 30. Because the vehicle width extended lines are superposed on the surrounding image displayed on the monitor 20, the driver may recognize the vehicle width from the image, and the vehicle width may be used for assisting the parking operation.

The parking target setting portion 4 included by the calculating portion 1 is a functional portion for setting a parking target position P4 (indicated in FIG. 4) of the vehicle 30. In this embodiment, setting the parking target position P4 and calculating a guiding locus to the parking target position P4 are executed in such a way that an approximate center portion Q of an axle of the rear wheels 28r of the vehicle 30 is considered as a reference point of the vehicle (hereinafter referred to as a reference point Q). Further, the guiding portion 5 included by the calculating portion 1 is a functional portion for calculating the guiding locus to the parking target position P4. The calculating portion 1 inputs detected results outputted from the steering sensor 14, the shift position sensor 15, the accelerator sensor 16, the brake sensor 17, the rotation sensor 18 and the like. The guiding portion 5 calculates the guiding locus to the parking target position P4 on the basis of the detected results outputted from the above-mentioned sensors. The indicative line output portion 6 included by the calculating portion 1 is a functional portion for generating an indicative line serving as an indication used for guiding the driver to appropriately execute a parking operation. The indicative line output portion 6 generates the indicative line for guiding the driver to execute a parking operation and superposes the indicative line on the surrounding image by means of the display controlling portion 3. Furthermore, a stall line detecting portion 7 included by the calculating portion 1 is a functional portion for determining whether or not a pair of stall lines W indicating the parking stall E exists in the surrounding image of the vehicle 30 captured by the camera 12 and obtained by the image obtaining portion 2.

In the embodiment, by use of known methods using the surrounding image captured by the camera 12, the indicating line is generated, the parking target position P4 is set and the guiding locus is calculated, therefore explanations of the methods are omitted here. Methods disclosed in JPH11-224470A and JP3762855P may be used, for example.

Figure 4:
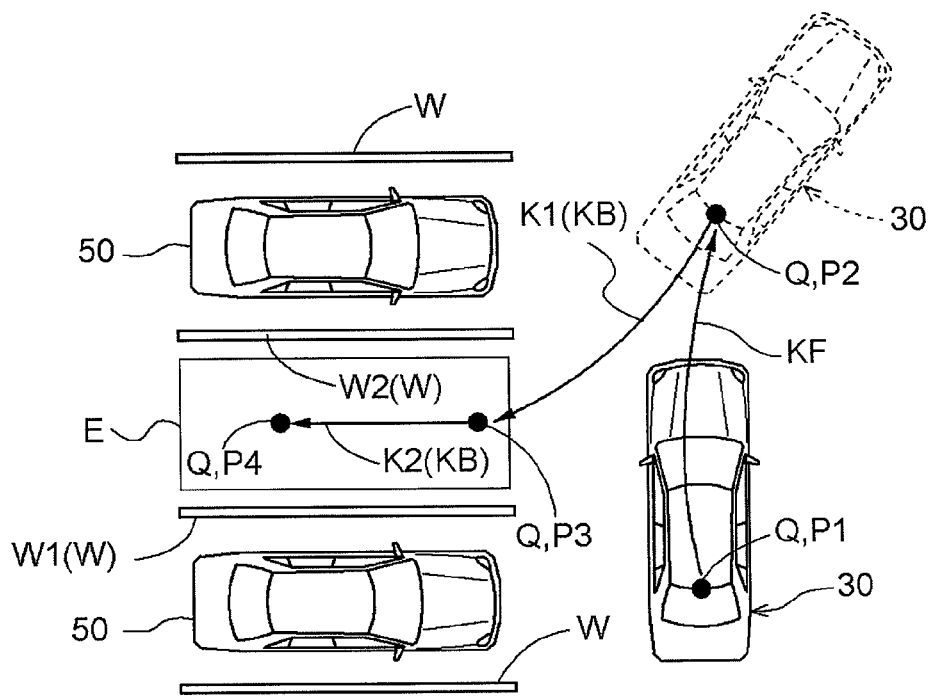
FIG. 4 is an explaining view indicating locus of the vehicle upon a parking operation.

FIG. 4 illustrates an explanation view indicating a moving locus of the vehicle 30 when a back-parking operation is executed in a manner where the vehicle 30 is reversed to be a predetermined parking position. According to this example illustrated in FIG. 4, the vehicle 30 is reversed and parked in the parking stall E located between other parked vehicles 50. In the example illustrated in FIG. 4, the other vehicles 50 are shown in order to clearly indicate the predetermined parking position, however, each of the other vehicles 50 does not need to be parked on one or the other side of the parking position, and the parking stall E may be a space regulated by the pair of stall lines W marked on a horizontal surface such as a land surface so as to be parallel to each other.

In FIG. 4, the reference point Q is set at the approximate center portion of the axle of the rear wheels 28r of the vehicle 30, and points 1 through 4 each indicates a position (coordinate point) of the reference point Q at a certain timing on a horizontal surface (land surface). According to the parking operation to park the vehicle in the parking stall E according to this example, the vehicle 30 firstly moves forward to a reverse starting point P2 following a forward moving locus KF forming an arc shaped trajectory by rotating the steering wheel in the right direction. Then, once the vehicle 30 reaches the reverse starting point P2, the vehicle 30 starts moving backward following a parking locus KB (K1, K2) forming an arc shaped trajectory by rotating the steering wheel in the left direction, and then the vehicle 30 is reversed so as to be parked in the predetermined parking stall E.

In this example, the vehicle 30 moves from the reverse starting point P2 so as to reach the parking target position P4 following the parking locus K1 forming an arc shaped trajectory and following the parking locus K2 forming a straight line trajectory, however, the parking locus may not be limited to the abovementioned configuration. For example, the parking locus K1 may be divided into two stages, one is a locus forming a straight line trajectory and the other is a locus forming an arc shaped trajectory by rotating the steering wheel. Furthermore, the parking locus K1 may be followed in a manner where the rotation amount of the wheel varies in accordance with the backward movement. The trajectory of the parking locus KB may be set to an appropriate form.

Figure 5:
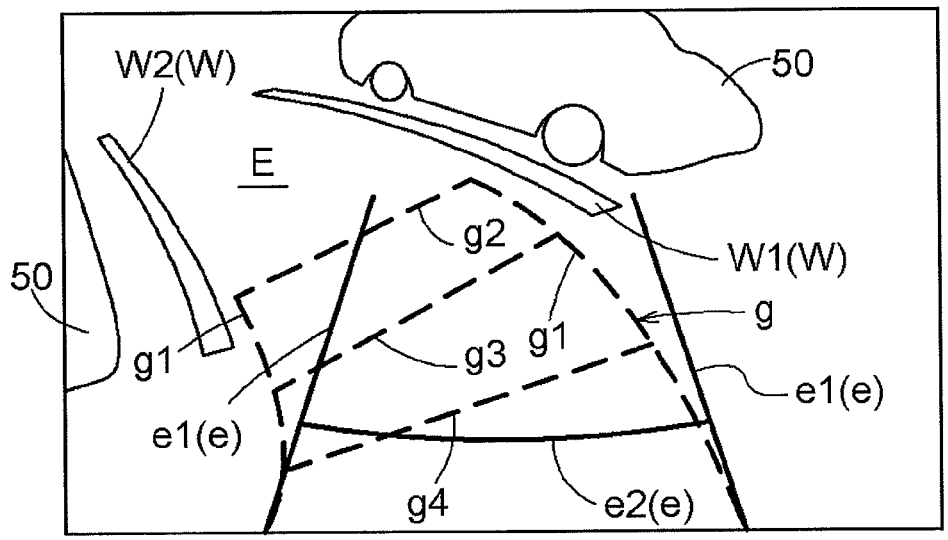
FIG. 5 illustrates an example of an image on a display.

In this embodiment, as the vehicle 30 moves backward, various kinds of indications outputted by the indicative line output portion 6 are superposed on the surrounding image by means of the display controlling portion 12. An example of the surrounding image on which the various indications are superposed is illustrated in FIG. 5. In the example of FIG. 5, a rear estimation line g and a vehicle rear line e are superposed on the surrounding image. The rear estimation line g is an indication of an estimated locus and the like of a rear end of the vehicle 30 depending on the wheel angle of the vehicle 30 moving backward. The vehicle rear line e is an indication of a rear predetermined position of the vehicle 30 not depending on the wheel angle of the vehicle 30.

According to the embodiment, the rear estimation line g includes a rear end estimated locus line g1 and distance guide lines g2, g3 and g4 of the rear of the vehicle 30. The rear end estimated locus line g1 indicates the estimated locus of the rear end of the vehicle 30. Specifically, the distance guide line g2 indicates a guide line of 5 m, the distance guide line g3 indicates a guide line of 3 m, and the distance guide line g4 indicates a warning line of 1 m. The rear estimation line g is basically shown with a yellow line in the embodiment.

Furthermore, according to the embodiment, the vehicle rear line e includes a pair of vehicle width elongated lines e1 indicating a width of the vehicle 30 and a distance guide line e2 indicating a guide line of 1 m. The vehicle rear line e is shown with a green line in the embodiment.

Figure 6:
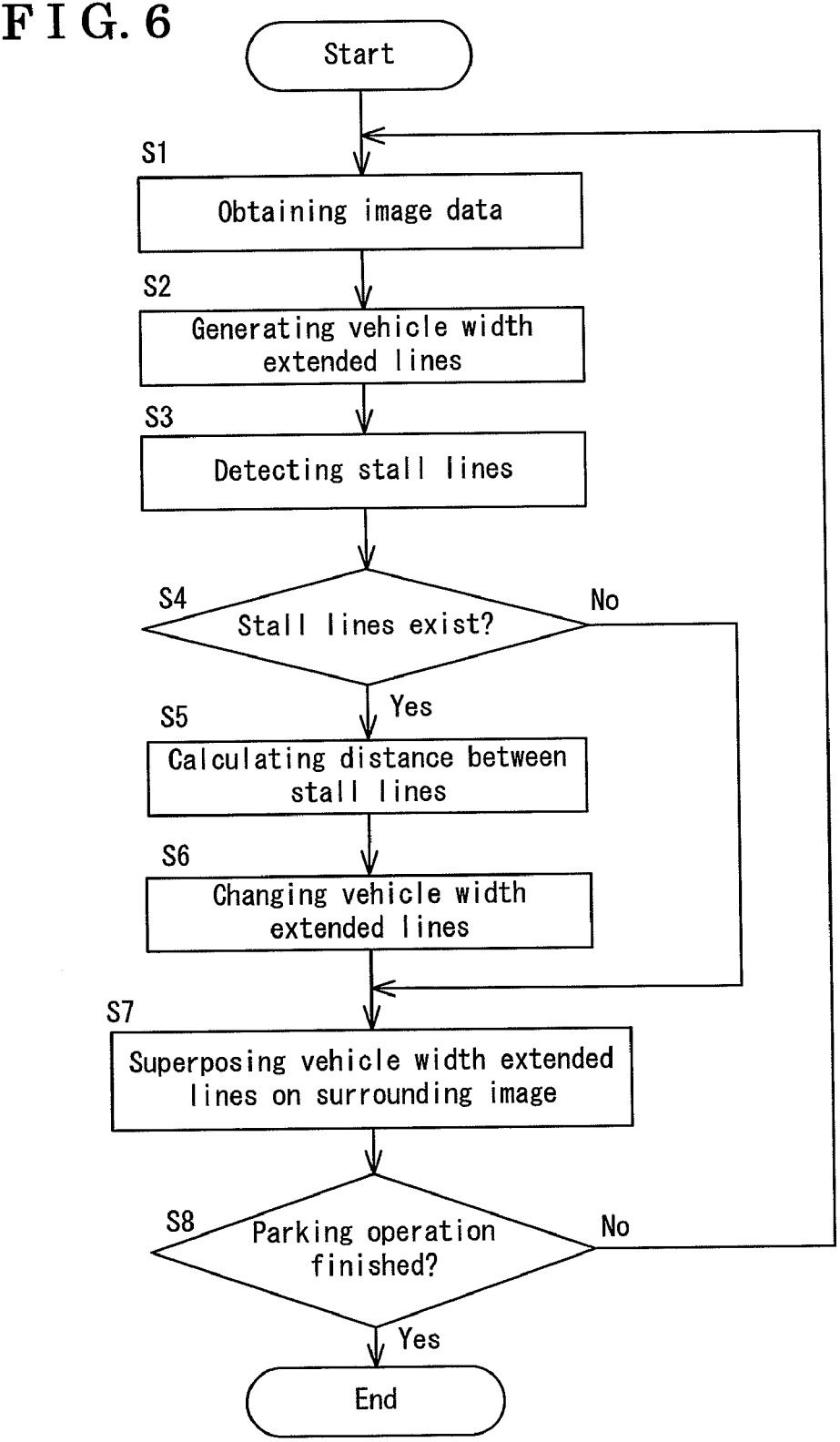
FIG. 6 illustrates a flowchart indicating processes executed by the parking assist device related to the present invention.

With reference to the abovementioned indications, when the vehicle moves backward so as to reach the point P3, and the steering wheel 24 is rotated so as to be return to an approximate neutral position, the parking assist device related to the present invention starts its functions. A process executed by the parking assist device at this point will be shown in a flowchart illustrated in FIG. 6.

According to the flowchart, the surrounding image of the vehicle 30 captured by the camera 12 is obtained as an image data by the image obtaining portion 2 (S1). The indicative line output portion 6 generates the pair of vehicle width extended lines f serving as the indicative lines for notifying the driver of the vehicle width (S2). According to the embodiment, the vehicle width extended lines f are set by extending a distance between the vehicle width elongated lines e1 to a predetermined distance, however, the vehicle width extended line f may be set in a different way. For example, in view of achieving a purpose of the present invention, various types of indicative lines, such as lines that are identical to the vehicle width elongated lines e1, or such as lines obtained by narrowing a width between the vehicle width elongated lines e1, may be used as the vehicle width extended lines f.

The stall line detecting portion 7 executes detection of the parallel stall lines W indicating the parking stall E by recognizing the lines from the obtained image data (S3).

Generally, at a parking lot having the abovementioned parking stall, a color of the land surface is a relatively dark color such as a color of asphalt, and a color of the stall line W is a relatively light color such as white and/or yellow. The stall line detecting portion 7 detects the stall line W on the basis of a level of brightness in the image data. Specifically, the image data is scanned by means of a known spatial filter such as a Gaussian filter or a Sobel filter in order to detect edges. On the basis of the detected edges, line elements are detected by means of a known technology such as Hough transform or the like. Another method for detecting the line elements may be used alternatively.

The edge detecting process may not be applied to the entire image data, and the edge detecting process may be applied to only a predetermined region of interest (ROI). The ROI may be set manually, however, because the size of the parking stall E is determined so as to be in a certain region to some extent, a region in which the stall line W exists may be estimated, and the estimated region may be set to the ROI.

When the stall line W is not detected by the means stall line detecting portion 7 (S4:No), the indicating line such as the vehicle width elongated lines e1 and the like generated by the indicative line output portion 6 are superposed on the surrounding image and displayed by means of the display 21 (S7).

On the other hand, when the stall lines W are detected by means of the stall line detecting portion 7 (S4:Yes), the calculating portion 1 calculates an actual distance between the stall lines W (S5). The actual distance between the stall lines W is calculated by means of a known method on the basis of a resolution of the image data, a depression angle of the camera 12, a distance between the stall lines W on the image data, a focal length of the camera 12 and the like.

The display controlling portion 3 obtains the distance between the stall lines W, and on the basis of the obtained distance between the stall lines W, a distance between the vehicle width extended lines f is extended, not changing a central point between the right vehicle width extended line f and the left vehicle width extended line f (S6). In other words, each of the vehicle width extended lines f is moved to the same distance so that positions thereof are changed so as to be apart from each other. Then, the display controlling portion 3 superposes the moved vehicle width extended lines f and other indicative lines on the surrounding image (S7).

The above processes are repeated until the parking operation is finished (S8:Yes). When the driver moves the shift lever 25 to a parking position, the shift position sensor 15 informs the calculating portion 1 of the change of the position of the shift lever 25, as a result, the calculating portion 1 determines that the parking operation has been finished.

Modified Example 1 of the Vehicle Width Extended Line

Figure 7:
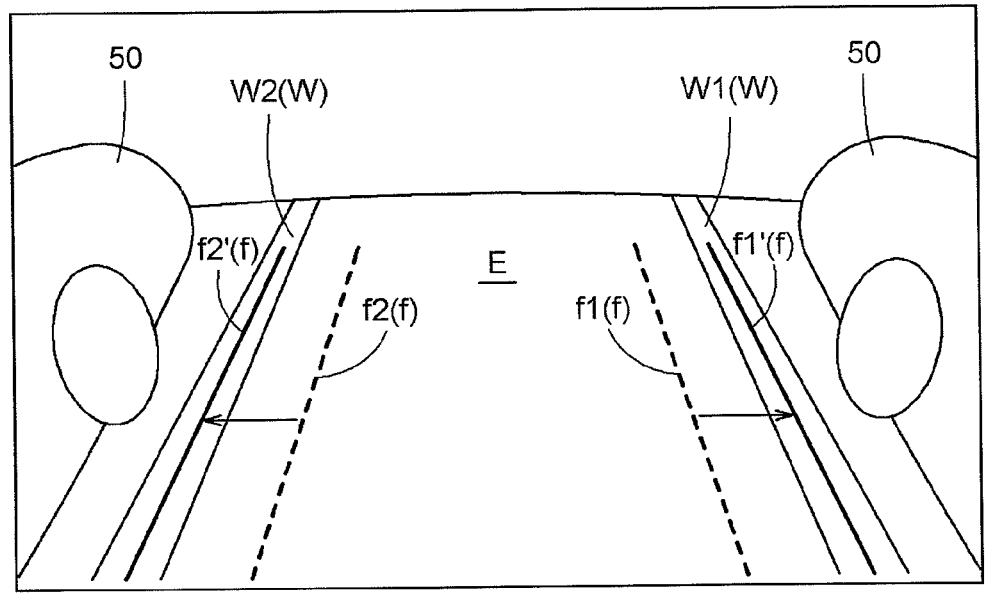
FIG. 7 illustrates an example of an image on the display.

A modified example of the embodiment will be explained below. In this example, the vehicle width extended line f is changed in a different way by the display controlling portion 3. FIG. 7 illustrates a drawing indicating an example in which, in a case where the distance between the stall lines W is greater than the width of the vehicle 30, the vehicle width extended line f is changed to be a vehicle width extended line f' that is generated by the indicative line output portion 6. In this modified example, on the basis of the stall lines W detected by the stall line detecting portion 7, the display controlling portion 3 firstly calculates a distance between center lines of the stall lines W, specifically, the center lines of the stall lines W1 and W2, and then the vehicle width extended lines f' are set in such a way that a distance thereof, specifically the distance between the vehicle width extended lines f1' and f2' becomes identical to the calculated distance between the center lines of the stall lines W1 and W2, and a central point between the vehicle width extended lines f1 and f2 becomes equal to a central point between the modified vehicle width extended lines f1' and f2'. Accordingly, when a central point of the axle in the right-left direction of the vehicle 30 is identical to the central point between the stall lines W in the vehicle width direction, each of the modified vehicle width extended lines f' is shown so as to overlap each of the stall lines W. The vehicle width extended line f is illustrated in FIG. 7 for the purpose of explanation; however, the vehicle width extended line f does not appear in an actual image on the monitor 20.

Modified Example 2 of the Vehicle Width Extended Line

Figure 8:
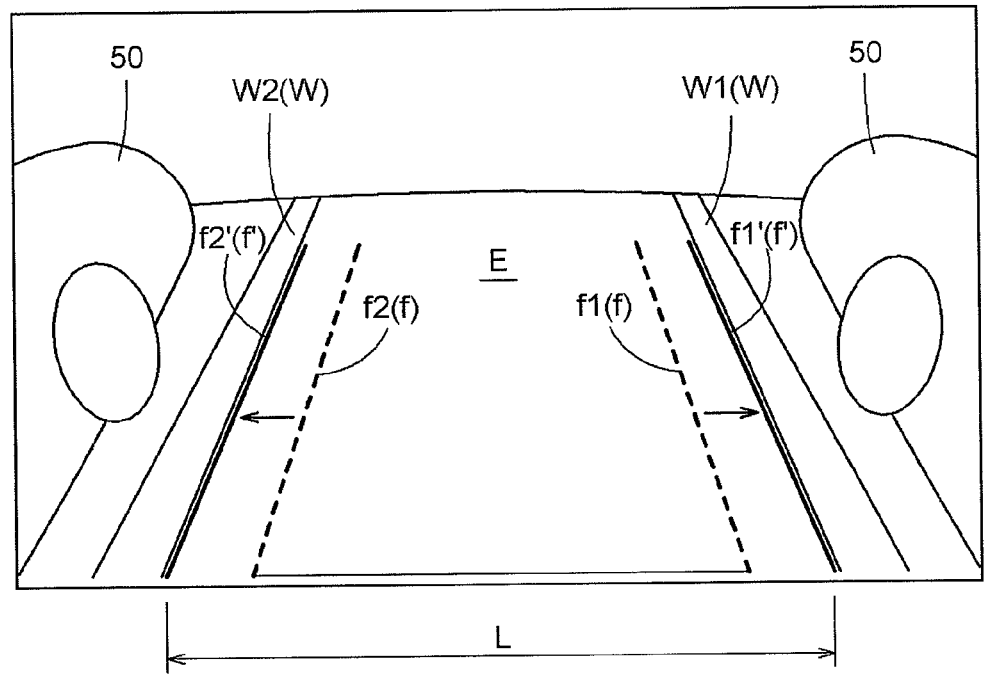
FIG. 8 illustrates an example of an image on the display.

FIG. 8 illustrates a drawing indicating another modified example. In this modified example, the vehicle width extended line f is changed in such a way that the distance between the vehicle width extended lines f1' and f2' at the outer sides thereof is identical to the distance between the stall lines W1 and W2 at the inner sides thereof. Accordingly, when the central point of the axle in the right-left direction of the vehicle 30 is identical to the central point between the stall lines W in the vehicle width direction, each of the modified vehicle width extended lines f' is shown so as to contact each of the stall lines W at the inner side thereof. Using the vehicle width extend lines f' of the modified example 2, the vehicle width extended lines f' do not overlap the stall lines W in the image on the monitor 20, so that a level of visibility may be appropriately improved.

Modified Example 3 of the Vehicle Width Extended Line

Figure 9:
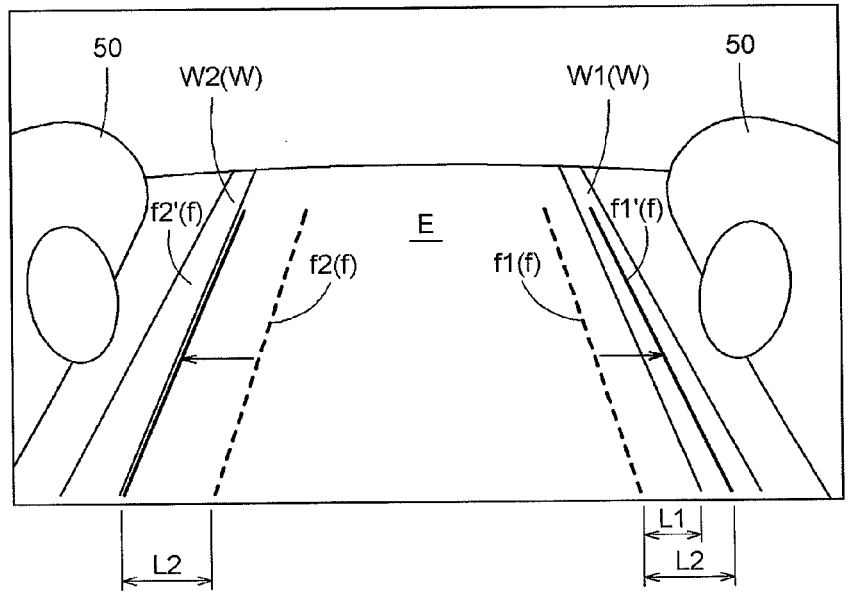
FIG. 9 illustrates an example of an image on the display.
Figure 10:
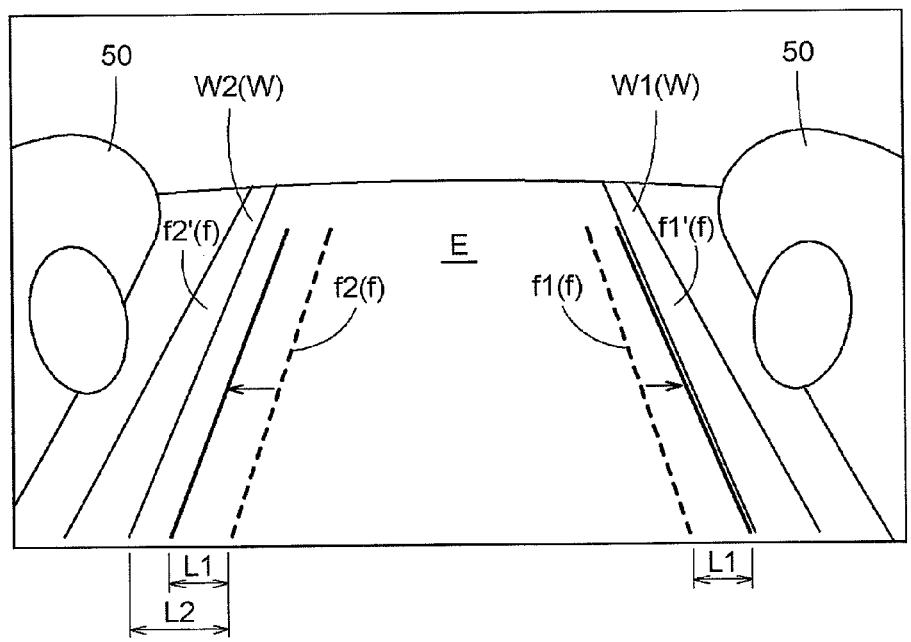
FIG. 10 illustrates an example of an image on the display.

When the axle in the right-left direction of the vehicle 30 is not identical to a central point of the parking stall E in a width direction thereof, the vehicle width extended line f may be changed as illustrated in the drawings of FIGS. 9 and 10. In the modified example indicated by the drawing illustrated in FIG. 9, a distance L1 between the vehicle width extended line f and the inner side of the stall line W1 and a distance L2 between the vehicle width extended line f2 and the inner side of the stall line W2 are calculated. When the distance L2 is greater than the distance L1, the vehicle width extended line f1 is changed so as to be positioned within the stall line W1 so that the distance L1 is equal to the distance L2. In other words, the vehicle width extended line f1' is set by moving the vehicle width extended line f1 toward the stall line stall line W1 by the distance L2, and the vehicle width extended line f2' is set by moving the vehicle width extended line f2 toward the stall line W2 by the distance L2. In the modified example illustrated in the drawing of FIG. 10, the vehicle width extended lines f1 and f2 are modified so as to be positioned within the area between the stall lines W. Thus, the driver may easily understand a difference between the parking stall E and the vehicle 30; as a result, the parking operation may become much easier.

Modified Example 4 the Vehicle Width Extended Line

Figure 11:
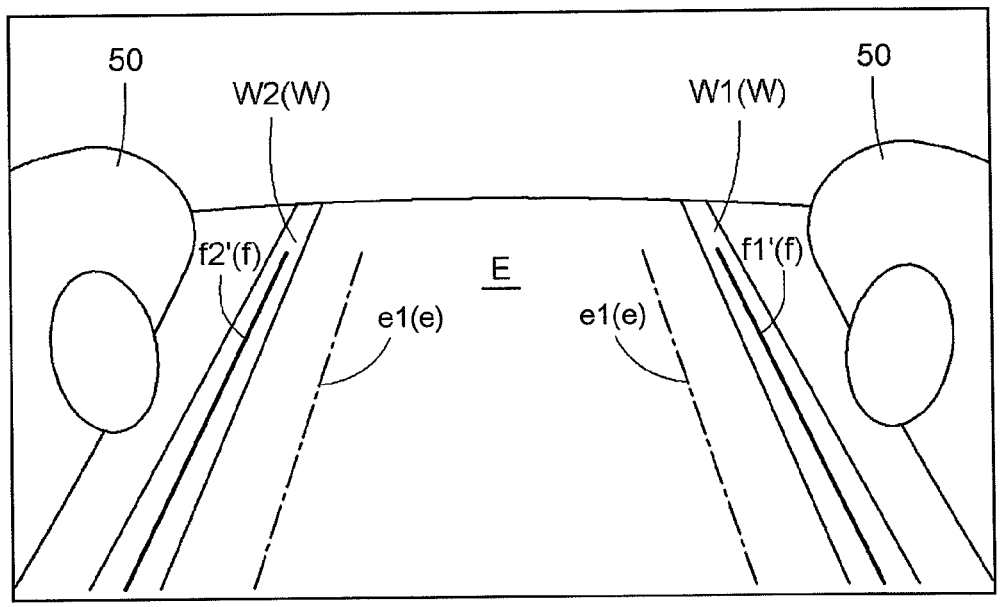
FIG. 11 illustrates an example of an image on the display.

Furthermore, as indicated in the drawing illustrated in FIG. 11, the display controlling portion 3 may display the vehicle width elongated lines e1 together with the vehicle width extended lines f so as to be interposed on the captured image. In this case, the vehicle width extended line f may be displayed with a line whose color and width being different from that of the vehicle width elongated line e1 in order to increase its identifiability. Because the vehicle width elongated line e1 is superposed on the surrounding image together with the vehicle width extended line f, the driver may accurately understand a positional relation between the vehicle 30 and the parking stall E, the parking operation to be an appropriate position within the parking stall E becomes much easier. In this modified example, the vehicle width elongated line e1 is displayed together with the vehicle width extended line f, however, another line such as the rear end estimated locus line g1 may be displayed together with the vehicle width extended line f.

In the abovementioned embodiments, the vehicle width extended line f before the modification is applied and the vehicle width extended line f' after the modification is applied may be displayed with different colors, different line types and the like so that the driver may clearly understand that the vehicle width extended line has been changed.

Further Embodiments (1) According to the above embodiments, when the parking assist device related to the invention starts its functions, other indications other than the vehicle width extended line f and the vehicle width elongated line e1 may be displayed so as to be superposed on the surrounding image. In such case, the indications to be displayed may be selected by the driver depending on his/her needs, or the indications to be displayed may be automatically selected based on circumstances around the vehicle 30 and the operation state of the driver.

(2) According to the above embodiments, the vehicle width extended line f before the modification is applied is not displayed, however the vehicle width extended line f before the modification is applied may be displayed together with the vehicle width extended line f' after the modification is applied.

(3) According to the above embodiments, the vehicle width extended line f based on the vehicle width elongated line e1 is used, however, the vehicle width extended line f being set on the basis of the rear end estimated locus line g1 or the like may be used alternatively.

According to the embodiment, when the display controlling portion displays the vehicle width extended lines so as to be interposed on the surrounding image in order to notify the driver of the vehicle width, the vehicle width extended lines are moved in such a way that the distance therebetween is changed in accordance with the distance between the stall lines. Accordingly, because the distance between the vehicle width extended lines is changed in accordance with the width of the parking stall, the driver may easily recognize the parking position. Specifically, the driver may execute the parking operation in such a way that, on the image, the pair of vehicle width extended lines overlap the pair of stall lines, as a result, the vehicle may be reversed in the parking stall at the central point of the parking stall and be parallel to the parking stall (not having an angle relative to the parking stall).

According to the embodiment, the display controlling portion (3) changes the distance between the vehicle width extended lines (f) in a case where the distance between the stall lines (W) is greater than the width of the vehicle (30).

In this configuration, the display controlling portion moves the vehicle width extended lines in such a way that the distance therebetween is changed only when the distance between the stall lines is greater than the width of the vehicle. Accordingly, when the width of the parking stall is smaller than the width of the vehicle, the vehicle width elongated lines are not changed. Seeing the vehicle width elongated lines that are not modified, the driver may recognize that the parking operation may be difficult. On the other hand, when the width of the parking stall is greater than the width of the vehicle, the vehicle width extended lines are moved in such a way that the distance therebetween is changed, as a result, the driver may easily recognize the parking position.

According to the embodiment, the distance between the outer sides of the vehicle width extended lines (f) is set to the distance between the vehicle width extended lines (f), and the distance between inner sides of the stall lines (W) is set to the distance between the stall lines (W).

In this configuration, the distance between the vehicle width extended lines is determined to be the distance between the outer sides of the vehicle width extended lines, and the distance between the stall lines is determined to be the distance between the inner sides of the stall lines. Accordingly, the distance between the vehicle width extended lines may be changed in such a way that the right vehicle width extended line is moved so as to contact the inner side of the right stall line and the left vehicle width extended line is moved so as to contact the inner side of the left stall line, as a result, the driver may easily recognize the positional relation between the stall lines and the vehicle.

According to the embodiment, the display controlling portion (3) displays the pair of vehicle width elongated lines (e) indicating the width of the vehicle, together with the vehicle width extended lines (f) so as to be superposed on the surrounding image In this configuration, because the vehicle width elongated lines are superposed on the surrounding image together with the vehicle width extended lines, the driver may accurately recognize the positional relation between the parking stall and the vehicle; as a result, the driver may easily park the vehicle in the target parking position.

According to the embodiment, the display controlling portion changes the distance between the vehicle width extended lines (f) when the steering angle is return to an approximate neutral position during the parking assist operation.

According to the embodiment, the display controlling portion changes the distance between the vehicle width extended lines (f) so that the vehicle width extended lines contacts with inner sides of the stall lines (W).

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A parking assist device comprising:
an image obtaining portion for obtaining a surrounding image of a vehicle, the surrounding image captured by an imaging device provided at the vehicle;
a display controlling portion for displaying the surrounding image and a pair of vehicle width extended lines on a displaying device provided at an interior of the vehicle in such a way that the pair of vehicle width extended lines is superposed on the surrounding image, the vehicle width extended lines serving as indicative lines for notifying a driver of a width of the vehicle; and
a stall line detecting portion for detecting a pair of stall lines in the surrounding image, the stall lines indicating a parking stall; wherein, when the pair of the stall lines is detected by the stall line detecting portion,
the display controlling portion changes a distance between the vehicle width extended lines corresponding to a distance between the stall lines,
a distance from one of the pair of vehicle width extended lines to the other of the vehicle width extended lines, with respect to the vehicle width direction, is larger than a length of the vehicle width.

2. The parking assist device according to claim 1, wherein the display controlling portion changes the distance between the vehicle width extended lines in a case where the distance between the stall lines is greater than the width of the vehicle.

3. The parking assist device according to claim 1, wherein a distance between outer sides of the vehicle width extended lines is set to the distance between the vehicle width extended lines, and a distance between inner sides of the stall lines is set to the distance between the stall lines.

4. The parking assist device according to claim 2, wherein a distance between outer sides of the vehicle width extended lines is set to the distance between the vehicle width extended lines, and a distance between inner sides of the stall lines is set to the distance between the stall lines.

5. The parking assist device according to claim 1, wherein the display controlling portion displays a pair of vehicle width elongated lines indicating the width of the vehicle, together with the vehicle width extended lines so as to be superposed on the surrounding image.

6. The parking assist device according to claim 2, wherein the display controlling portion displays a pair of vehicle width elongated lines indicating the width of the vehicle, together with the vehicle width extended lines so as to be superposed on the surrounding image.

7. The parking assist device according to claim 3, wherein the display controlling portion displays a pair of vehicle width elongated lines indicating the width of the vehicle, together with the vehicle width extended lines so as to be superposed on the surrounding image.

8. The parking assist device according to claim 4, wherein the display controlling portion displays a pair of vehicle width elongated lines indicating the width of the vehicle, together with the vehicle width extended lines so as to be superposed on the surrounding image.

9. The parking assist system according to claim 1, wherein the display controlling portion changes the distance between the vehicle width extended lines when the steering angle is return to an approximate neutral position during the parking assist operation.

10. The parking assist system according to claim 1, wherein the display controlling portion changes the distance between the vehicle width extended lines so that the vehicle width extended lines contacts with inner sides of the stall lines.

11. The parking assist system according to claim 1, wherein each of the vehicle width extended lines is a line which is located at a position so that each of the vehicle width extended lines is a same distance from a center position between the vehicle width extended lines.

* * * * *